United States Patent
Pietraszek et al.

(10) Patent No.: US 8,869,514 B2
(45) Date of Patent: Oct. 28, 2014

(54) METHOD AND DEVICE FOR CONTROLLED DOSING OF A GAS WITH FLUCTUATING SUPPLY PRESSURE

(75) Inventors: Jan Pietraszek, Allerod (DK); Tue Johannessen, Glostrup (DK)

(73) Assignee: Amminex Emissions Technology A/S, Soborg (DK)

( * ) Notice: Subject to any disclaimer, the term of this patent is extended or adjusted under 35 U.S.C. 154(b) by 191 days.

(21) Appl. No.: 13/634,334

(22) PCT Filed: Nov. 3, 2010

(86) PCT No.: PCT/EP2010/006704
§ 371 (c)(1),
(2), (4) Date: Dec. 27, 2012

(87) PCT Pub. No.: WO2011/113454
PCT Pub. Date: Sep. 22, 2011

(65) Prior Publication Data
US 2013/0098003 A1  Apr. 25, 2013

Related U.S. Application Data

(60) Provisional application No. 61/314,354, filed on Mar. 16, 2010.

(30) Foreign Application Priority Data

Mar. 16, 2010  (EP) ..................................... 10002762

(51) Int. Cl.
*F01N 3/00* (2006.01)
*B01D 53/90* (2006.01)
*F01N 3/20* (2006.01)
*F16K 17/00* (2006.01)
*B01D 53/94* (2006.01)

(52) U.S. Cl.
CPC ............. *F16K 17/00* (2013.01); *B01D 2258/01* (2013.01); *B01D 53/90* (2013.01);
(Continued)

(58) Field of Classification Search
USPC ............ 60/274, 286, 295, 297, 300, 301, 303
See application file for complete search history.

(56) References Cited

U.S. PATENT DOCUMENTS 5,809,775 A * 9/1998 Tarabulski et al. ............... 60/274
6,087,336 A * 7/2000 Edwards et al. ............. 514/17.9
(Continued)

FOREIGN PATENT DOCUMENTS

DE   29708591        7/1997
DE   10207984 A1   10/2003
(Continued)

OTHER PUBLICATIONS
International Search Report and Written Opinion dated Feb. 8, 2011 for Application No. PCT/EP2010/006704.
(Continued)

Primary Examiner — Binh Q Tran
(74) Attorney, Agent, or Firm — Frost Brown Todd LLC

(57) ABSTRACT

A method for controlled dosing of a gas with fluctuating supply pressure ($P_{Supply}$). Dosing of the gas through a valve (6) is performed while a valve (5) is closed, and the decrease in control-volume pressure ($P_{CV}$) is recorded. The control-volume pressure ($P_{CV}$) is raised by closing dosing valve (6) and opening the valve (5). The amount of the dosed gas is calculated based on the known volume ($V_{CV}$) of the control volume (4) and at least one of the change in control-volume pressure ($P_{CV}$) and control-volume temperature ($T_{CV}$) in the period where valve (5) is closed. The amount of dosed gas is compared with a target or set-point to adjust or regulate the subsequent dosing period or dosing event.

17 Claims, 8 Drawing Sheets

(52) U.S. Cl.
CPC ......... *F01N 3/208* (2013.01); *B01D 2253/108* (2013.01); *B01D 2257/404* (2013.01); *F01N 2610/10* (2013.01); *Y02T 10/24* (2013.01); *F01N 2610/02* (2013.01); *B01D 2253/204* (2013.01); *B01D 2253/102* (2013.01); *B01D 53/9495* (2013.01); *B01D 2259/12* (2013.01); *F01N 2610/14* (2013.01); *B01D 2251/2062* (2013.01)
USPC .................. 60/286; 60/274; 60/295; 60/300; 60/301; 60/303

(56) References Cited

U.S. PATENT DOCUMENTS

| | | | |
|---|---|---|---|
| 6,119,710 | A | 9/2000 | Brown |
| 6,301,897 | B1 * | 10/2001 | Uchida ........................... 60/728 |
| 6,387,336 | B2 | 5/2002 | Marko et al. |
| 6,390,034 | B1 * | 5/2002 | Orzal et al. ............. 123/73 AD |
| 6,837,041 | B2 * | 1/2005 | Hernier ........................... 60/286 |
| 6,928,807 | B2 * | 8/2005 | Jacob et al. ..................... 60/286 |
| 6,935,103 | B2 | 8/2005 | Binder et al. |
| 7,823,436 | B2 | 11/2010 | Monkowski et al. |

FOREIGN PATENT DOCUMENTS

| | | | |
|---|---|---|---|
| DE | 102006061370 | A1 | 6/2008 |
| DE | 102007022858 | A1 | 11/2008 |
| DE | 102008002612 | A1 | 12/2009 |
| EP | 1977817 | A1 | 10/2008 |
| JP | H05-127755 | A | 5/1993 |
| JP | 09017734 | | 1/1997 |
| JP | 2001-500063 | | 7/2001 |
| JP | 2004-03445 | | 1/2004 |
| JP | 2008-508186 | | 3/2008 |
| JP | 2008-546968 | | 12/2008 |
| WO | WO 2006/012903 | A2 | 2/2006 |
| WO | WO 2006/065426 | A2 | 6/2006 |
| WO | WO 2007/000170 | A1 | 1/2007 |
| WO | WO 2008/077652 | | 7/2008 |
| WO | WO 2008/119492 | A1 | 10/2008 |
| WO | WO 2011/113454 | A1 | 9/2011 |

OTHER PUBLICATIONS

International Preliminary Report on Patentability and Written Opinion dated Sep. 18, 2012 for Application No. PCT/EP2010/006704.
English Abstract and Machine Translation of German Patent No. DE 102006061370A1.
English Abstract and Machine Translation of German Patent No. DE 102007022858A1.
German Abstract and English Machine Translation of Abstract and German Patent No. DE 102008002612A1.
European Search Report dated Aug. 5, 2010 for Application No. EP 10002762.
English Machine Translation of German Patent No. DE 29708591, Jul. 17, 1997.
Japanese Office Action dated Jul. 31, 2014 for Application No. 2012-557413.

* cited by examiner

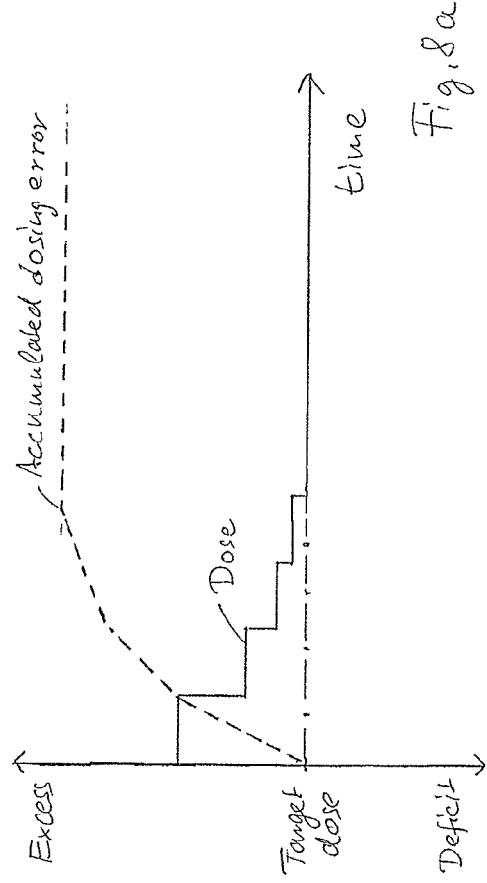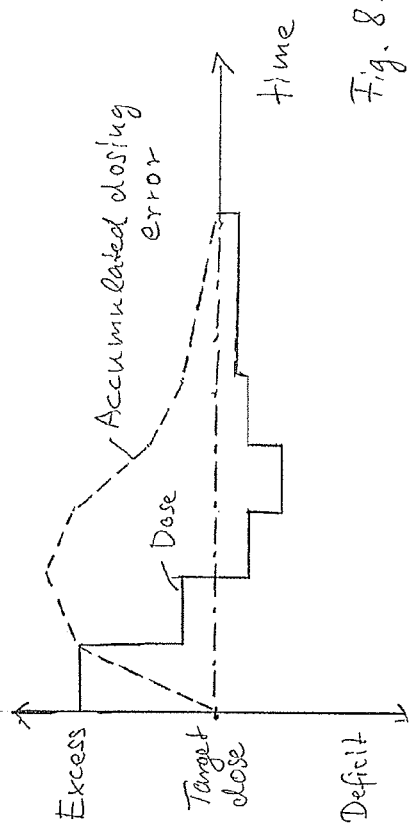

METHOD AND DEVICE FOR CONTROLLED DOSING OF A GAS WITH FLUCTUATING SUPPLY PRESSURE

FIELD OF THE INVENTION

This invention relates to a method and device for controlled dosing of a gas with fluctuating supply pressure. For example, solid ammonia storage materials can be used as sources for ammonia in an ammonia consuming process. Ammonia is made available from a solid storage material, for example by controlled thermal desorption from the solid by means of heating. In particular, the invention relates to a method and device for controlled dosing of ammonia at a relatively low, fluctuating gauge pressure created by desorption from a solid ammonia storage material. The method may also be used for other systems or concepts where there is a desire for controlled dosing of a gas that being generated, e.g. by thermal desorption from a source of gas at fluctuating pressure—either in the supply side or at the point of dosing.

BACKGROUND OF THE INVENTION

Ammonia is a widely used chemical with many applications. One specific application is as reductant for selective catalytic reduction (SCR) of $NO_x$ in exhaust gas from combustion processes.

For most applications, and in particular in automotive applications, the storage of ammonia in the form of a pressurized liquid in a vessel is too hazardous. Urea is a safe, but an indirect and impractical method for mobile transport of ammonia since it requires urea to be transformed into ammonia by a complex process involving spray, evaporation, thermolysis and hydrolysis $((NH_2)_2CO+H_2O \rightarrow 2\ NH_3+CO_2)$, which is difficult to achieve under driving conditions with low engine load or cold weather.

A storage method involving ad- or absorption of molecular ammonia in a solid can circumvent the safety hazard of pressurized liquid ammonia and eliminate the problem with conversion of a liquid reductant.

Metal ammine salts are examples of ammonia absorbing and desorbing materials, which can be used as solid storage media for ammonia (see, e.g. WO 2006/012903 A2), which in turn, as mentioned above, may be used as the reductant in selective catalytic reduction to reduce $NO_x$ emissions.

When a gas, e.g. ammonia, is generated by thermal desorption from a heated storage unit, it is an advantage for improved safety that the operating pressure of the storage material is not too high above atmospheric level, e.g. 1.5-3 bar (absolute). However, this is an operating range that is the most challenging in terms of low gauge pressure for a gas injector valve and it is also observed that the pressure fluctuates significantly because of the different time scales of the system: fast dosing according to a demand signal (time scale of seconds) and slow response time of pressure as a function of heating (minutes).

Therefore, there is a need for a new method and device for controlled dosing of ammonia from solid ammonia storage systems. Especially for automotive applications, a new method and device should preferably not introduce new, costly equipment—rather use existing types of equipment but embedded in a new configuration and with new control strategy.

SUMMARY OF THE INVENTION

The invention relates to a method for controlled dosing of a gas with fluctuating supply pressure of said gas. The gas is generated by desorption from a solid storage material. The method is carried out by using an apparatus comprising:
  a control volume with a known volume;
  a supply valve that controls the fluid communication between a source of the gas and the control volume;
  a dosing valve that controls the fluid communication between the control volume and a process whereto the gas is being dosed;
  a pressure sensor and a temperature sensor that measure pressure and temperature of the gas in the control volume.

The method comprises:
a. dosing of the gas through the dosing valve while the supply valve is closed and recording the decrease in control-volume pressure;
b. raising the control-volume pressure by closing the dosing valve and opening the supply valve; and
c. calculating the amount of the dosed gas based on the known volume of the control volume and at least one of the change in control-volume pressure and control-volume temperature in the period where valve is closed;
d. comparing the amount of dosed gas with a target or setpoint to adjust or regulate the subsequent dosing period or dosing event.

According to another aspect a controller is provided for a vehicle that uses solid ammonia storage material for the purpose of removing NOx by selective catalytic reduction. The controller is programmed to carry out the method described above.

According to a further aspect a device is provided for controlled flow of a gas to a process. The device comprises:
  one or more storage units containing solid storage material capable of reversible absorption, or adsorption, and desorption of the gas, said unit being equipped with heating to release the gas by desorption, or being connected to a vacuum pump that releases the gas by desorption because of reduced gas phase pressure;
  a control volume with a pressure sensor and temperature sensor to determine pressure and temperature of the gas in the control volume;
  a valve on each side of the control volume, that is a supply valve and a dosing valve, for controlling the flow of the gas into the control volume from the one or more storage units when the dosing valve is closed while the supply valve is open and to dose the gas through the dosing valve when the supply valve is closed;
  a controller that is programmed to control the heating or the vacuum pump of the one or more storage units to obtain a supply pressure within a desired interval between am minimum supply pressure and a maximum supply pressure, upstream of the control volume and furthermore to carry out the dosing method described above.

GENERAL DESCRIPTION

The invention relates to a method and device for controlled dosing of a gas with a fluctuating supply pressure $P_{Supply}$. In one exemplary embodiment the gas is generated by thermal desorption from a solid storage material; thermal desorption is e.g. achieved by heating the solid storage material. In another exemplary embodiment the gas is generated by a vacuum pump connected to a solid storage material that releases the gas by desorption because of reduced gas phase pressure. The method is based on a control volume (CV) concept with a known volume $V_{CV}$ with a valve on each side of the enclosed volume and having a pressure sensor and a temperature sensor that measures temperature ($T_{CV}$) and pressure ($P_{CV}$) of the gas in the control volume. Dosing of the gas is done via one of the valves (the dosing valve) while the other valve (the supply valve) is closed. Dosing can be performed until a lower critical pressure level ($P_{CRIT}$, also called the minimum pressure $P_{MIN}$) is reached. During dosing the dosing valve may be permanently open, or the dosing may be performed by a series of short (small) pulses. In the latter case, several small dosing events may be carried out before a refilling of the control volume is carried out. Both a long dosing activity with a permanently open dosing valve and one short pulse is called a "dosing event". A series of dosing events is also called a "dosing period". Filling of the control volume for the next long dosing event, or dosing cycle, is done through the supply valve connected to the solid storage unit while the dosing valve is closed. By recording the decrease in pressure, $P_{CV}$, it is possible to calculate or estimate the dosed amount knowing $V_{CV}$, $\Delta T_{CV}$ and/or $\Delta P_{CV}$. To record the decrease in pressure, $P_{CV}$, in some embodiments only the initial pressure level after filling and the low pressure level, $P_{CRIT}$, which is reached (or close to being reached) at the end of the (long) dosing event, or the end of the dosing period (in the case of a sequence of short pulsing events) are measured. For example, in some of the embodiments in which a plurality of short dosing events are performed during a dosing period between subsequent control-volume refills the amount dosed during a single short pulse is not measured; rather, control may be performed, for example, by controlling the number of dosing pulses, determining the total amount dosed in the whole dosing period by measuring the pressures (and optionally the temperatures) at the beginning and the end of the dosing period, and by regulating the number of dosing pulses in the next dosing period if a difference between the dosing target and the actual dose has been observed.

In other embodiments, the decrease is recorded by also measuring intermediate pressure levels, e.g. during a long dosing events, or the pressure at the start and/or end of each short pulsing event (in the case of a sequence of short pulsing events). In some embodiments intermediate pressure measurements are supplemented by intermediate temperature measurements in order to also record $\Delta T_{CV}$ for intermediate levels of $\Delta P_{CV}$ measured, e.g. for each short pulsing event.

In some of the embodiments in which a dosing period comprised a plurality of short dosing events there is no need to measure the pressure drop within a single dosing event, because of the dosing events are short the pressure can approximately assumed to be constant during a dosing event, and only goes down in a stepwise manner from event to event. Therefore, in some of these embodiments only one pressure level is measured for a dosing event (e.g. the initial pressure before opening the dosing valve, the final pressure after having closed the dosing valve, or an average pressure during the dosing event), and the amount dosed during the event is approximated based on a product (i.e. multiplication) of the single measured pressure value and the opening time of the dosing valve, and optionally the temperature of the gas in the control volume, for the dosing event in question.

The amount of dosed gas calculated, or estimated, in one of these ways is compared with a target or set-point, and the subsequent dosing (long) dosing event or period is adjusted or regulated based on this comparison. Although the activities a to d are listed in the order a, b, c, d in claim 1, refilling (activity b) is decoupled from calculating the amount dosed (activity c) and feeding the result back to adjust the subsequent (long) dosing event or dosing period (activity d), so that the activity b can be carried out parallel with, or even after, the activities c and d.

As indicated above, in some of the embodiments in which a plurality of short dosing events are performed during a dosing period between subsequent control-volume refills the amount of gas dosed in each short dosing events is calculated based on a measurement of the pressure reduction, or the absolute pressure and the opening time, and, optionally, the temperature during the dosing event.

In some of these embodiments comparison of the dosed amount and feed-back control is not only compared for the dosing period, but also for the individual dosing events. In these embodiments, a comparison with a dosing target for the short dosing event is performed, and feedback to adjust the amount to be dosed in the next short dosing event in the case of a difference observed between the dosing target and the actually amount dosed in the short dosing event.

There are different methods of how the total amount dosed during a dosing period comprising a plurality of short dosing events is determined. In some embodiments in which the amount of gas dosed in each single short dosing events is calculated based on a measurement of the pressure reduction, or the absolute pressure, and, optionally, the temperature for each dosing event, the total amount of gas dosed during the entire dosing period is calculated by summing the individual doses of all dosing events of that dosing period.

Another method to determine the total amount dosed during an entire dosing period is to measure the control-volume pressures and, optionally, the control-volume temperatures, at the beginning and at the end of the dosing period, and to determine the totally dosed gas on the basis of these measurements. Even if all the intermediate pressures (and, optionally, temperatures) are known and all the doses of the short dosing events have been calculated, in some embodiments it may lead to more accurate results if the total amount dosed during an entire dosing period is based on a measurement at the beginning and the end of the dosing period, because the resulting error resulting from one bigger difference of two measurements is usually smaller than the combined error of a sum of measurements of a series of smaller differences. For example, in some embodiments in which feed-back is performed both at the level of dosing events and dosing periods, the value of the total amount dosed during an entire dosing period used for the feed-back control at the level of the dosing period is based on a measurement at the beginning and the end of the dosing period, while the value of the amount dosed during a short dosing event is used for the feed-back control at the level of the short dosing event.

It has been recognized that the gas pressure fluctuates significantly during dynamic dosing of ammonia from solid storage systems, e.g. using thermal desorption for providing a supply pressure. This can be seen in FIG. 7 of WO2008119492A1. It is assumed that the main reason for the pressure fluctuation is the relatively long time scale of heat conduction in the storage solid, compared with a shorter time-scale of variations in the dosing demand. In embodiments with a vacuum pump to generate the supply pressure the cause of pressure fluctuation is not the relative time scale of heat conduction, but the fluctuations of the pressure may come from the vacuum pump, e.g. caused by on/off control of the vacuum pump. Often, the pressure on the supply side is not the only fluctuating pressure in cases where solid materials are used as sources for gas dosing. At the point of dosing, e.g. the exhaust line of a vehicle, the absolute pressure may also change from 1.1 to 1.3 bar (but not limited to that range) when the load of the engine changes and the gas has to pass through different catalytic units and the muffler. The challenge is therefore accurate and reliable dosing under these highly dynamic conditions. Controlled dosing of ammonia—or any gas in general—is typically done by either of three methods:

Gas injector type: a fast on/off valve requiring a high supply pressure can make accurate dosing because critical (sonic) flow is established in the nozzle of the injector and the dosing correlated directly with the opening time. However, a high and preferably constant supply pressure is required, i.e. 3-4 bar absolute pressure when assuming dosing to a point with approx. 1 bar (absolute) gas pressure.

Mass flow controller: Low supply pressure and especially fluctuating supply pressure can be handled by having a proportional valve and a mass flow sensor in series with a PID algorithm adjusting the valve according to the demand signal and the reading of the flow sensor.

Pressure-corrected pulsing valve: An on/off injector-type valve may be able to perform better at low supply pressure if the pulse valve is correlated with the actual pressure gradient across the valve but obtaining the proper accuracy is challenging.

It has been recognized that all three methods above may suffer from a weakness of not being able to cover a large range, e.g. a factor of 100 or more between minimum and maximum dosing demand and—in particular—mass flow controllers are expensive and often vulnerable pieces of equipment. Being able to operate at as low pressure as possible increases safety and also reduces power consumption because operating at a lower pressure also means lower operating temperature of the unit and therefore lower heat loss to the surroundings. Lastly, both a refined gas injector in one case and a flow sensor element in another case are sensitive components that may deteriorate by low quantities of e.g. humidity or impurities/particles following the gas that is being dosed.

The present invention solves the above mentioned challenges by a so-called control volume (CV) dosing concept.

In a first embodiment, a method of gas dosing to a process 15 from a source 14 of gas pressure is carried out by using a control volume 4 encapsulated by two valves: one valve intersecting with the gas supply pressure from the source 14, e.g. a heated solid storage unit, and another valve for dosing. The CV has sensors to measure pressure, $P_{CV}$ (7), and temperature, $T_{CV}$ (8), and when dosing is required, the valve to the supply (5) is closed and the dosing valve (6) is opened and/or regulated. Dosing may be performed by short (small) pulses of gas, also called "dosing events". Such a dosing event has a drop in $P_{CV}$, which is much lower than a drop from (or close to) $P_{SUPPLY}$ to (or close to) $P_{CRIT}$. In such a case, several small dosing events may be carried out in a dosing period, i.e. before a refilling of the control volume is carried out. Dosing is possible as long as $P_{CV}$ is above a certain critical level, $P_{CRIT}$, where the pressure drop and the pressure at the point of dosing does not allow for the required flow of the gas. Thus, the critical lower pressure threshold ($P_{CRIT}$) may be at or above a level at which a pressure gradient between the control volume and the process that uses the dosed gas is insufficient for controlled dosing of gas. When $P_{CRIT}$ is reached (or close to) in the CV, the dosing valve 6 can be closed (or short-pulsing be stopped) and the supply valve 5 opened thereby raising $P_{CV}$ to $P_{Supply}$ and be ready for next dosing period. An increased flow rate can be obtained by rapid cycling, i.e. by repeatedly carrying out the activities a., b., c and d defined in claim 1. Repeating this cycle can give the functionality of pseudo-continuous dosing—especially since the filling time is fast. In each cycle, the amount dosed can be calculated from the known volume of the CV ($V_{CV}$) and the change in $P_{CV}$ and $T_{CV}$. Knowing the change in $P_{CV}$ and/or $T_{CV}$ can be used to calculate the dosed mass of the gas and this can be compared with a target or set-point to adjust the subsequent dosing period or dosing event. For example, if the calculated mass dosed in the current dosing period or dosing event is below the target/set point, dosing in the subsequent dosing period/dosing event will be adjusted, or regulated, towards an increase of the amount of mass to be dosed (e.g. by increasing the opening of the dosing valve, or increasing a duty ratio of short-pulsing), in order to compensate for the deficit of mass dosed in the current dosing period/dosing event. Likewise, if the calculated mass dosed in the current dosing period or dosing event is above the target/set point, dosing in the subsequent dosing period/dosing event will be adjusted, or regulated, towards a decrease of the amount of mass to be dosed (e.g. by decreasing the opening of the dosing valve, or decreasing a duty ratio of short-pulsing), in order to compensate for the excess of mass dosed in the current dosing period/dosing event period. This corresponds to feedback-control; since the target/set point may vary dynamically, it is a dynamic feedback control which can control the mass dosed to a varying target/set point dynamic.

In some embodiments, the feedback control aims at adjusting the amount of gas actually dosed (e.g. the actually dosed mass) in each single dosing event, or dosing period, to become equal, or at least close, to the target amount for that dosing event/period or to follow as closely as possible—with discontinuous dosing—a continuous demand signal with a dynamically changing demand level Thus, a deficit or excess of the actually dosed amount that shows up in one dosing event/period will cause the subsequent dosing events/periods to exhibit only a reduced, or no, deficit or excess. In other embodiments the feedback control provides compensation for previous excess or deficit. In response to a deviation between the dosing target, or set-point, the amount of dosed gas is regulated so that the accumulated dosed amount (accumulated over a plurality of dosing events or periods) corresponds to the accumulated target amount. This means that if the amount dosed was above the target amount per event/period in one dosing event/period (excess) the subsequent dosing event/period or events/periods (or, if there is a delay, one or more later events/periods) will be adjusted to exhibit a deficit, and vice versa, so that excess and deficit is compensated and the sum of the dosed amounts is close, or equal, to the accumulated target amount, or the integrated demand signal.

Typically, there will always be a change in pressure, $P_{CV}$, when the gas is dosed. In some extreme situations, e.g. if the temperature of the dosing hardware (incl. the control volume) undergoes a change caused by the surroundings while having very low dosing rates, then it is possible to dose a small quantity of gas with $P_{CV}$ being constant because $T_{CV}$ has increased. However, in most cases, $P_{CV}$ will decrease and $T_{CV}$ will be almost constant because of low heat capacity of the gas and rather high heat capacity of the dosing hardware and the thermal mass of the control volume.

In some embodiments, a high flow rate is obtained by rapidly filling the CV with the gas by open/closing of the supply valve 5 and opening the dosing valve 6 completely thereby emptying the CV as fast as possible and refilling again trough the supply valve 5.

In some embodiments, the volume of the CV is designed or optimized according to an analysis of either of the parameters: required dosing flow range $[F_{MIN}; F_{MAX}]$, the desired operating interval of the supply pressure, $[P_{MIN}; P_{MAX}]$, the amount or type of heated storage material, the lower pressure threshold for dosing ($P_{CRIT}$) and the operating temperature interval, [$T_{MIN}$; $T_{MAX}$]. A combination of low supply pressure, high gas temperature and high flow demand typically requires a larger CV because of low gas density and high mass flow demand—and vice versa for high pressure, low temperature and low flow demand. The chosen volume for CV reflects a compromise between the borders of operating conditions.

In some of the embodiments, the gas being dosed is ammonia.

In some embodiments, the solid storage material from which the ammonia is generated by thermal desorption or a vacuum pump is, e.g. a zeolite, active carbon or metal ammine complex, the storage material being capable of storing ammonia by absorption or adsorption.

In thermal-desorption embodiments, heating of the storage material in the container may be carried out to achieve a pressure, $P_{Supply}$, e.g. in a certain interval, $P_{MIN}$ to $P_{MAX}$, that is to say heating is used to control the operating range of the supply pressure $P_{Supply}$.

In some of the ammonia-gas embodiments the dosed ammonia is used for NOx reduction from the exhaust of a combustion engine by way of Selective Catalytic Reduction (SCR). The ammonia consuming process requiring controlled dosing of ammonia is an SCR catalyst for NOx reduction from exhaust coming from an internal combustion engine.

In yet another embodiment, the method of determining the flow of the gas is used to verify the reading and/or accuracy of a mass flow sensor, e.g. as a back-up measurement in a system where there is already a flow sensor present but where this flow sensor requires an independent validation of the accuracy or detection of e.g. drifting of the sensor.

Furthermore, the invention may comprise a controller that carries out the objectives of the described method when interfaced with the proper pressure and temperature sensors as well as actuators.

In one embodiment of the invention, the gas is made available from one or more heated storage units (1 or 1a) containing (reversible) storage material (3 or 3a) capable of desorption of the gas. A control volume 4 contains or is interfaced with a pressure sensor 7 and temperature sensor 8 to determine pressure, $P_{CV}$, and temperature, $T_{CV}$, of the gas in the control volume 4. Valves on each side of the control volume, 5 and 6, control when to dose and when to refill the control volume. A controller (9) is programmed to control the heating (2 or 2a) of the units (1 or 1a) to obtain a supply pressure, $P_{Supply}$ targeting the desired interval $P_{MIN}$ to $P_{MAX}$, upstream of the control volume and furthermore to carry out the dosing method according to any one the description mentioned above.

Some embodiments have a specific dosing valve, chosen among e.g. solenoid on/off (injector-type) or proportional valve.

Some embodiments use an accumulation of calculated mass of dosed gas to provide an integrated value of the gas dosing. This is in particular relevant in the case of repeated dosing events caused by e.g. pulsing. As already indicated above, in some embodiments, the feedback control provides compensation for previous excess or deficit. In response to a deviation between the dosing target, or set-point, the amount of dosed gas is regulated so that the accumulated dosed amount (accumulated over a plurality of dosing events/periods) corresponds to the accumulated target amount. This means that if the amount dosed was above the target amount per event in one dosing event/period (excess) the subsequent dosing event/period or events/periods (or, if there is a delay, one or more later events/periods) will be adjusted to exhibit a deficit, and vice versa, so that excess and deficit is compensated and the sum of the dosed amounts is close, or equal, to the accumulated target amount.

Some embodiments contain more than one storage unit connected to the system and therefore a valve 10, e.g. active or passive valve, is implemented to prevent the gas being generated by desorption in one unit to be absorbed in another unit that has a lower temperature and therefore lower pressure.

In some embodiments of single or multi-tank systems, the supply pressure, $P_{Supply}$, may be recorded by the sensor of the control volume once the valve to the supply is open. This allows for only one pressure sensor integrated in the system.

However, in other embodiments there is also an additional pressure sensor 16 (or sensors 16) to make an independent measurement of pressure from the storage units in addition to the pressure sensor 7 of the CV.

In some of the embodiments the supply pressure $P_{Supply}$ of the storage unit and the pressure in the control volume are measured alternatively with the same pressure sensor, that is the pressure sensor 7 of the control volume 4. The supply pressure $P_{Supply}$ of the storage unit is determined by the pressure sensor 7 during periods where the dosing valve 6 is closed and the supply valve 5 is open, while the pressure in the control volume 4 is determined by the pressure sensor 7 during periods where the supply valve 5 is closed and the dosing valve 6 is open or closed.

In some embodiments the control volume's pressure sensor is the single pressure sensor of the whole gas desorption and dosing device, and the pressure of the supply pressure $P_{Supply}$ of the storage unit is determined by the single pressure sensor.

If the refill events were chosen very short the pressure rise in the control value could be insufficient, e.g. when it would only rise from $P_{Crit}$ to $P_{Crit}+0.1*(P_{Supply}-P_{Crit})$. However, on the other hand, to obtain exactly (or close to) $P_{Supply}$ in the control volume 4 during refill might take too long. Therefore, in some embodiments the extended opening time is long enough to ensure that the pressure sensor's signal is within 50%, 20%, 10%, 5% or 1% of the actual supply pressure $P_{Supply}$ from the storage unit. For example, the average opening time of the supply valve may be chosen such that only 50 to 80% of the pressure difference between from $P_{Crit}$ to $P_{Supply}$ is reached, e.g. by an opening time of the supply valve 5 of 5-200 ms. The supply pressure $P_{Supply}$ of the storage unit can nevertheless be determined by the control volume's pressure sensor 7 during each refill period by correcting the pressure value measured by a correction factor which corrects for the fact that $P_{Supply}$ is not reached due to the relatively short opening time. For example, if the opening time is such that only 50% of $P_{Supply}$ is expected to be reached the measured pressure is multiplied by a correction factor in the order of 2.

In other embodiments the supply pressure $P_{Supply}$ of the storage unit is not determined at each filling incident in all dosing events, but only at a subsample of the filling events, e.g. in every $n^{th}$ filling event, where n is a natural number greater than 1. The opening time of the supply valve in those filling incidents in which the supply pressure $P_{Supply}$ of the storage unit is determined is extended, so that it is longer than the average opening time of the supply valve 5 in filling incidents in which the supply pressure $P_{Supply}$ is not determined. This gives the opportunity to get an accurate direct reading of the supply pressure during normal operation, without a need to correct it for the fact that the equilibrium pressure is not reached to due a normally short filling time. The advantage of this is that a separate sensor to measure the supply pressure precisely is not needed, and is not provided, but the task is performed by the control volume's pressure sensor 7 in intervals.

This discontinuous measurement only in extended filling events is suitable for applications in which a continuous measurement of $P_{Supply}$ is not needed. For example, in some embodiments the heating of the solid storage material is controlled by feed-forward controlled based on an ammonia demand signal, e.g. from an engine controller. An overlaid feedback control based on the discontinuous measurement of $P_{Supply}$ in extended filling events is provided which reduces, or terminates, the supply of heat by the heating when measured $P_{Supply}$ is above an upper pressure threshold, and increases or starts the supply of heat by the heater when measured $P_{Supply}$ is below a lower pressure threshold, as described in WO 2008/119492, which is incorporated herein by reference (in particular, p. 13, l. 22-26, p. 21, l. 18-37, and FIG. 11 of WO 2008/119492 pertain to the overlaid feedback control).

In other embodiments with a vacuum pump the discontinuous measurement of $P_{Supply}$ in extended filling events is used to control the operation of the vacuum pump, e.g. by a feedback controller which attempts to keep $P_{Supply}$ close to a target supply pressure and initiates switching on and off the vacuum pump when the measured $P_{Supply}$ falls below or exceeds the target pressure, respectively. For example, a suitable gas-desorption system with a vacuum pump is described in WO 2007/000170, which is incorporated herein by reference (a vacuum-pump embodiment is, for example, described on p. 20, l. 16-p. 21, l. 4, and FIG. 1 of WO 2007/000170).

In certain operational states of the gas consuming process (e.g. the ammonia consuming process) the dosing set-point is zero over an extended period of time. This may be the case, e.g. when the system is in the startup phase where pressure is only building up by the initial heating, and/or in automotive SCR applications in coasting mode when no fuel is injected so that no ammonia dosing is needed. In some embodiments, when the dosing set-point is zero, that is to say when the dosing valve is closed, the supply valve is kept open, e.g. over the extended time period, and the supply pressure $P_{Supply}$ of the storage unit is then permanently measured by the pressure sensor of the control volume. The advantage of this is that it is possible to measure the cartridge pressure continuously e.g. when the system is in the startup phase or other situations where no dosing is required, without an additional pressure sensor in the storage system upstream of the control volume.

The present description of embodiments of the method also includes a description of embodiments of a controller for a vehicle that uses solid ammonia storage material for the purpose of removing NOx by selective catalytic reduction. The controller is programmed to carry out one or several of the methods described herein.

In some embodiments, the controller is part of a device for controlled flow of a gas to a process. It is programmed to control the heating or the vacuum pump of the one or more storage units to obtain a supply pressure $P_{Supply}$ within a desired interval between a minimum supply pressure $P_{MIN}$ and a maximum supply pressure $P_{MAX}$ upstream of the control volume, according to one or several of the methods described herein. The device comprises one or more storage units containing solid storage material capable of reversible absorption, or adsorption, and desorption of the gas, said unit being equipped with heating to release the gas by desorption, or being connected to a vacuum pump that releases the gas by desorption because of reduced gas phase pressure; a control volume with a pressure sensor and temperature sensor to determine pressure ($P_{CV}$) and temperature ($T_{CV}$) of the gas in the control volume; a valve on each side of the control volume, that is a supply valve and a dosing valve, for controlling the flow of the gas into the control volume from the one or more storage units when the dosing valve is closed while the supply valve is open and to dose the gas through the dosing valve when the supply valve is closed.

In some embodiments the device is for removing or reducing NOx from the exhaust of an internal combustion engine by dosing ammonia according to the control volume method. The device stores ammonia in one or more storage units and the storage material is metal ammine complexes such as $Sr(NH_3)_8Cl_2$, $Ca(NH_3)_8Cl_2$, $Mn(NH_3)_6Cl_2$, $Mg(NH_3)_6Cl_2$, or mixtures thereof. The storage material generates ammonia supply pressure by heating via electrical resistance heater and/or using waste heat of the engine or by using a vacuum pump to desorb ammonia by reducing the gas pressure in the storage unit.

In some embodiments the dosing valve is a solenoid valve arranged to provide on/off pulsing, or a proportional valve.

In some thermal-desorption embodiments an additional storage unit (1a) is provided and an additional storage-unit valve, either an active or a passive check valve, which prevents the gas from the heated storage unit (1) to be absorbed in the additional storage unit (1a) when the additional storage unit (1a) is either not heated, or has a lower pressure than the heated storage unit. For example, the additional storage unit (1a) may be bigger in size than the storage unit (1), and may only be heated to refill the storage unit (1) when the latter gets depleted. Ammonia release from the smaller storage unit (1) can be more dynamically controlled than that from the bigger storage unit (1a), due to the lower thermal inertia of the smaller storage unit (1). Owing to this the smaller storage unit (1) is used (i.e. heated) during normal driving operation to better cope with fluctuating ammonia demands, while the bigger storage unit (1a) is only used (i.e. heated) to refill the smaller storage unit (1).

As indicated above, in some embodiments the pressure sensor 7 of the control volume 4 is the only pressure sensor of the device for controlled flow of a gas to a process and has a double function to alternatively measure the supply pressure $P_{Supply}$ of the at least one storage unit and the pressure in the control volume (4), depending on the open or closed state of the supply valve (5) and the dosing valve (6).

In some embodiments the control volume (4) is placed in an upright or inclined orientation in which the outlet from the dosing valve (6) is positioned lower than, or equal in height with, the lowest point of the control volume (4) and is positioned lower than the supply valve (5). This prevents a build-up of condensate or impurities inside the control volume. If impurities (small particles or small liquid drops/condensate) are carried by the fluid flow and gravity, there will be no build up in the control volume. These impurities would be "blown out" in the lower part of the unit where the dosing valve (6) is located. A build up of impurities in the control volume would result in reduction of the control volume and, as a consequence, an error on the measurement of the fluid flow.

The supply and dosing valves typically have orifices. In some embodiments, the orifice of the supply valve is larger than that of the dosing valve. This will result in a shorter filling time of the control volume and thereby an ability to make more well-defined dosing cycles, and to render the supply-pressure measurement more direct, reducing the amount of correction to be applied to the measured pressure during open periods of the supply valve.

In some embodiments the same net effect as with orifices of different sizes is achieved by rapid open/close-pulsing of the dosing valve, with an adjustable duty factor to slow down the dosing flow in a controllable manner, while the supply valve is not rapidly on-off pulsed, but is kept permanently open during the whole filling events. "Dosing of the gas through the dosing valve while the supply valve is closed" in point (a) of claim 1 includes rapid on-off pulsing as well as permanent-open dosing.

In some embodiments the supply and dosing valves are designed—e.g. by using a specific spring force in a valve - to be forced open at a relief pressure to provide a pressure relief function. This obviates the need for separate security valves (pressure-relief valves) and thus helps to reduce costs and number of components of the system.

In order to find the opening time of the supply valve in some embodiments a look-up table is provided which provides the opening time for a required dose linked to the pressure in the control volume. Interpolation may be made between the values in the table. In some embodiments the look-up table is dynamically updated over time. Because of wear on the valves or moisture, the flow conditions through the dosing valve may change. To cope with this, the values in the look-up table will be evaluated and values changed, if the difference between actual dosed Ammonia and the values from the look-up table exceeds a specific value.

Although certain advantages have been presented of embodiments only having a single pressure sensor which measures both the control-volume pressure and the (optionally not completely reached) supply pressure, in other embodiments the supply pressure $P_{Supply}$ from one or more heated storage units is measured with at least one additional pressure sensor 16 to provide a measurement of supply pressure $P_{Supply}$ that is independent of the pressure sensor 7 that is used for the control volume.

Other features and use of the method or embodiments in similar applications that require controlled dosing of gas made available from a solid storage media are inherent in the methods disclosed or will become apparent to those skilled in the art from the following detailed description of embodiments and its accompanying drawings.

BRIEF DESCRIPTION OF THE DRAWINGS

FIG. 8 illustrates two different embodiments of feed-back control of dosing to reduce or eliminate deviations or the actually dosed amount from the target dose.

Table 1 shows examples of operating characteristics of a dosing system according to the invention where it is highlighted how the method works under the different combinations of extremes of the parameter space, e.g. high pressure and low temperature vs. low pressure and high temperature.

DESCRIPTION OF EMBODIMENTS

Figure 1A:
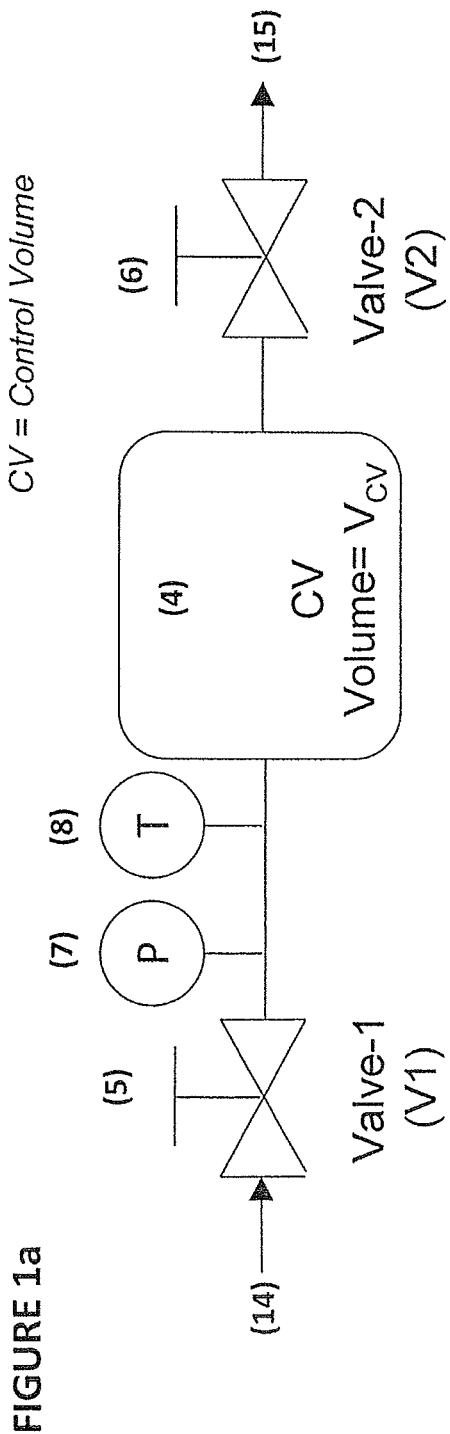
FIGS. 1a and 1b shows embodiments of the invention.
Figure 1B:
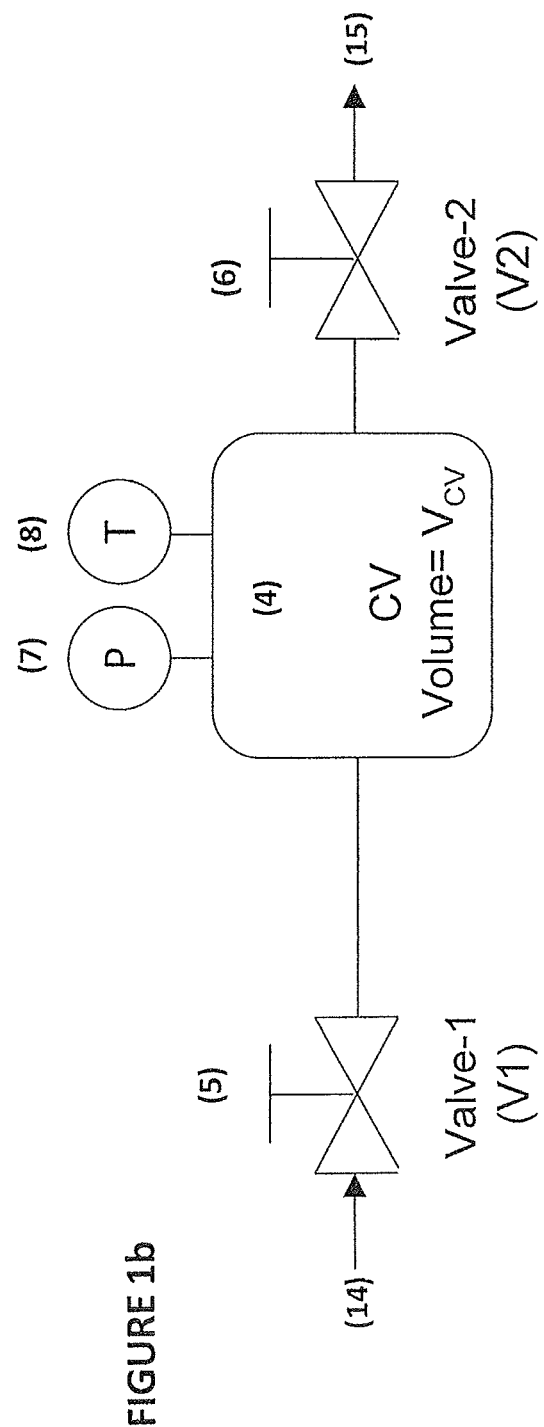

FIGS. 1a and 1b shows embodiments of the invention where the control volume 4 is placed in between the valve 5 leading to the gas supply 14 and a dosing valve 6 leading to the place/process 15 that requires the dosed gas. Temperature 8 and pressure 7 sensors are attached to (FIG. 1b) or interface with (FIG. 1a) the control volume 4 to measure $T_{CV}$ and $P_{CV}$. The CV is filled by closing the dosing valve 6 and opening the supply valve 5. Dosing can be done after closing the supply valve 5 and actuating the dosing valve 6. The amount dosed is calculated or estimated by the change in $P_{CV}$ and $T_{CV}$ after a dosing event or period or during the dosing when using a proportional valve. A dosing period may be a period of continuous opening of the dosing valve between two filling events, or consist of numerous pulses of gas until a certain lower pressure, $P_{CRIT}$, is reached whereby the flow cannot overcome the pressure at the point of dosing. At that time, the CV should be refilled by opening supply valve 5 and closing dosing valve 6. The period of continuous opening or a single short pulse of gas is a "dosing event".

The size of the control volume 4 is dimensioned according to requirements for dosing accuracy while considering one or more of the parameters: required dosing flow range, [$F_{MIN}$; $F_{MAX}$]; the nominal operating supply pressure interval, [$P_{MIN}$; $P_{MAX}$], from the supply of the gas 14; the lower pressure threshold for dosing ($P_{CRIT}$), and/or the operating temperature interval, [$T_{MIN}$; $T_{MAX}$].

Figure 2:
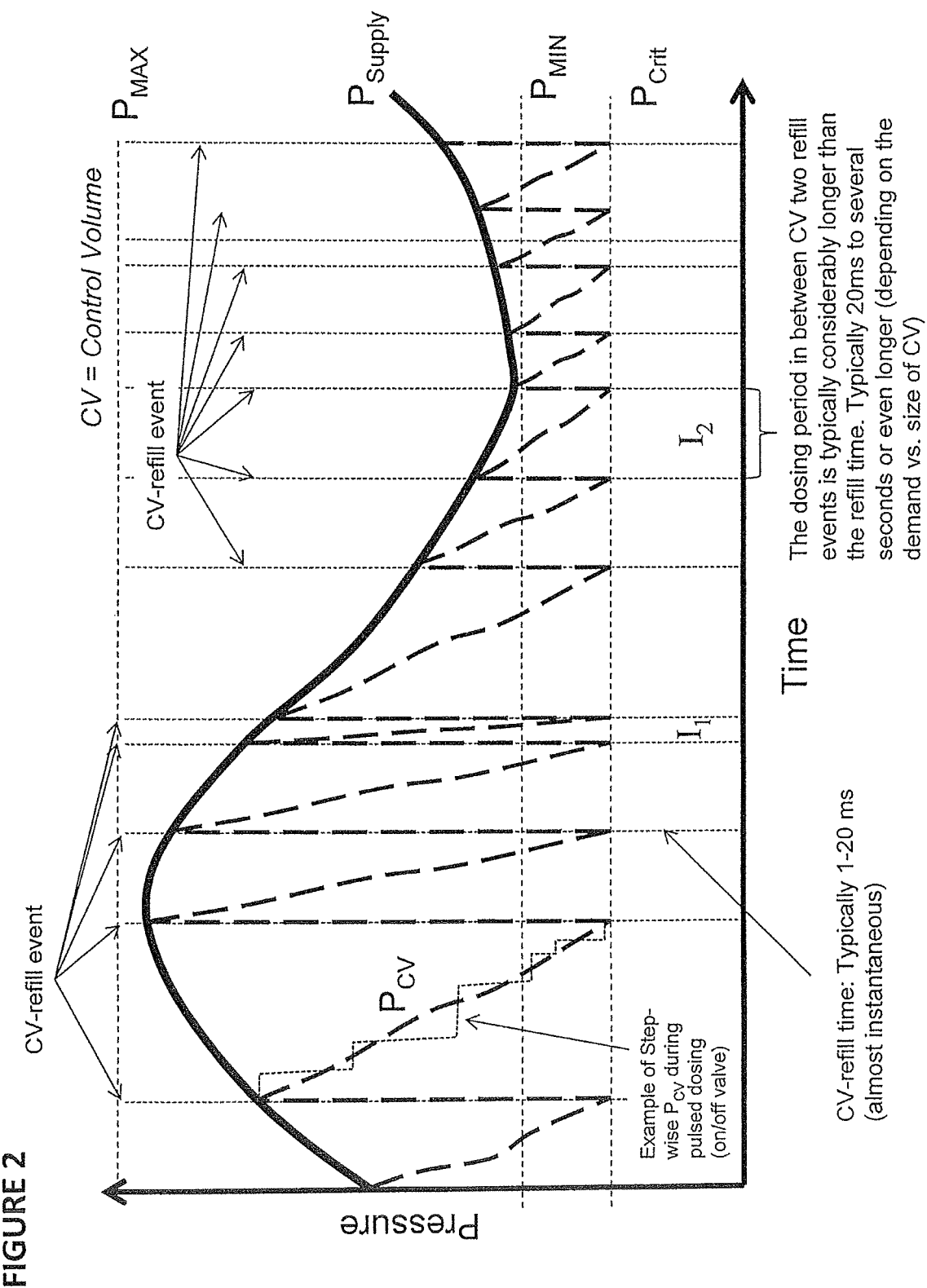
FIG. 2 shows a schematic of key-parameters such as pressure and dosing intervals of a system using the method of the inventions.

FIG. 2 shows how the principle works when the supply pressure is not constant. The thick, black line is the desorption pressure from the heated storage unit. It is typical that the pressure is fluctuating or oscillating e.g. because of delay between heating and the response by raise in temperature of the material and the corresponding raise in pressure, or—in embodiments with vacuum-based desorption—due to on/off-control of the vacuum pump.

The time-axis is split into a number of dosing periods—each event being separated by a dotted, vertical line. The Y-axis, i.e. the pressure, has indication lines for the maximum/minimum ($P_{MAX}/P_{MIN}$) operating pressure of the storage unit and also a low, critical level, $P_{CRIT}$ at which point the CV has to be refilled. It is illustrated that $P_{Supply}$ (thick, solid curve) first is raising and then dropping. At each filling incident, which is typically very short (e.g. 1-20 ms for a control volume of 5 to 500 ml), there is an increase in $P_{CV}$ to reach, or come close to, the level $P_{Supply}$. In FIG. 2 the pressure rise during the filling events is illustrated by vertical lines since the dosing periods are longer than the filling periods so that the absolute value of the slope of the control-chamber pressure vs. time is bigger during filling period than that during dosing period. The pressure function during filling periods is drawn by vertical lines to illustrate this difference in slope, but actually the pressure during filling will not rise instantly, but with a finite slope. Moreover, in FIG. 2 the control-chamber pressure is shown to reach the level $P_{Supply}$ at the end of each filling period, while in some embodiments the filling time is chosen so short, at least in some or most of the filling events, that the level $P_{Supply}$ is not reached but only a fraction, e.g. 80% of it.

When dosing is active, $P_{CV}$ drops towards $P_{CRIT}$ and a corresponding amount of ammonia escapes the CV and reaches the point of dosing. Several operation characteristics can be observed from this:

Low average flow rates are obtained when the interval of the dosing period is long (e.g. I2) and high flow rated are obtained in short intervals (e.g. I1).

Dosing may be done by a proportional valve thereby giving smooth $P_{CV}$ curves or it may also be done by multiple pulsing events leading to a more step-wise decrease in pressure as indicted in one of the dosing intervals.

When $P_{Supply}$ is close to $P_{MIN}$, then the control volume will be filled with a lower mass of the gas and the refill is preferably done more frequently for the same average dosing flow.

It is seen that $P_{CV}$ is equal to $P_{Supply}$ after refilling and this can be used to determine the pressure from the supply unit without having an additional pressure sensor. However, this can only be used during refill and not during dosing. If the dosing/refill cycle is rather short (e.g. every 0.1-10 seconds) then this method for measuring $P_{Supply}$ would be sufficient, e.g. for the heater or the vacuum pump of most solid storage systems to be controlled based on such a "parasitic" measurement of $P_{Supply}$ by a single pressure sensor associated with the control volume.

Table 1 shows a specific example where a requirement for dosing has resulted in one proposed configuration. In this example, the dosing demand spans by a factor of 250 from 0.1 to 25 mg $NH_3$ per second. The storage unit is targeting an operating pressure within the limits of 1.8 to 5 bars—with 2-3 bar being example of a nominal operating pressure range but the system may reach the more extreme values of 1.8 and 5 bars. The operating temperature is thought to be from 233K to 353K. The lower critical pressure for dosing is assumed to be $P_{CRIT}$=1.3 bar.

In order to determine the mass of the gas dosed the following information is available, if the ideal gas law is assumed:

$$P = \rho RT, \rho = P/(RT), M/V = P/(RT), M = VP/(RT), \text{ where}$$

M: mass of gas, V: volume, R: Gas constant (R=488, 2 J/(kg K) for ammonia),
T: temperature $M_{CV-1} = M_{CV-2} + M_{dosed}$ where $M_{CV-2}$ is the mass of gas left in the control volume after a dosing period. The subscript "CV-1" refers to the conditions before the dosing period. The condition "CV-1" may also simply be the supply condition from the storage unit, i.e. $P_{Supply}$. Now we have:

$$M_{dosed} = M_{CV-1} - M_{CV-2} = V_{CV} P_{CV-1}/(RT_{CV-1}) - V_{CV-2}/(RT_{CV-2})$$

The volume, $V_{CV}$, is constant so we have:

$$M_{dosed} = V_{CV}/R(P_{CV-1}/T_{CV-1} - P_{CV-2}/T_{CV-2}) \quad \text{(Equation 1)}$$

or rearranged to give the resulting pressure after dosing:

$$P_{CV-2} = T_{CV-2} [p_{CV-1}/T_{CV-1} - M_{dosed} R/V_{CV}], R=488, 2175 \; J/(kg \; K) \quad \text{(Equation 2)}$$

Equation 2 can be used to illustrate how the dosing range can be realized with a certain choice of $V_{CV}$.

Equation 1 and 2 may be supplemented by a function of $T_{CV}$ and $T_{Surroundings}$ and/or the physical parameters of the dosing hardware (heat capacity, insulation, heating created by e.g. electrical coils of valves) and the control volume that describes a change in $T_{CV}$ over time, e.g. during a start-up phase. This can be used to calculate how a change in temperature does not have the same influence on dosing mass as the actual measurements of $T_{CV}$ would indicate. As an example, a transient where $T_{CV}$ undergoes an increase by passive heating from the surroundings should not result in the same dosed mass as if the system would be exposed to a constant temperature level. This type function could be implemented to increase the accuracy of the method.

In table 1, $V_{CV}$ is chosen to be 0.2 dl (20 ml) and the first column shows the pressure after dosing, $P_{CV-2}$, as a function of different combinations of supply pressure ($P_{Supply}$ or $P_{CV-2}$), temperatures and flow. Three types of combinations are given: High, medium and low for each parameter.

Taking a few examples, then we can see that the maximum flow can be dosed at minimum pressure and max. temperature (min. density of the gas in CV) by dosing 5 mg per cycle and a cycle freq. of 5 Hz. To dose 5 mg, the pressure drops from 1.8 to 1.37 each time 5 mg is dosed and this pressure level is still higher than the assumed $P_{CRIT}$ of 1.3 bars.

Another example is how to dose minimum flow at maximum pressure and minimum temperature (max. density of gas in CV). This is here done by dosing 1 mg per cycle and with a freq. of 0.1 Hz.

This pulsing can be removed by using a proportional valve at the outlet valve (6) and then it is possible to have a continuous flow except in the short time of around 10-20 ms where the control volume is refilled with ammonia.

The overall procedure can be recapitulated:
1) Close dosing valve (6) and open the supply valve (5) for e.g. 20 ms
2) Record pressure ($P_{CV-1}$, which is then close to or equal to $P_{Supply}$). The value of $P_{CV-1}$ can also be determined during the opening of the supply valve 5 when $dP_{CV}/dt \approx 0$
3) Close supply valve (5)
4) Measure pressure $P_{CV}$ and, optionally, temperature $T_{CV}$ continuously
5) Regulate dosing valve (6) based on equation 1 while measuring pressure $P_{CV}$ and, optionally, temperature $T_{CV}$.
6) If $P_{CRIT}$=1,3 bar(a) is reached, go to 1). Optionally, the refilling can be done before actually reaching $P_{CRIT}$.

The choice of $V_{CV}$ influences how much the pressure changes during dosing and the highest accuracy is obtained when there are relatively large changes of the pressure in between refilling of CV. This can be used in the optimization of size of CV and cost of components (driven by the requirement for accuracy on e.g. a pressure sensor).

Figure 3:
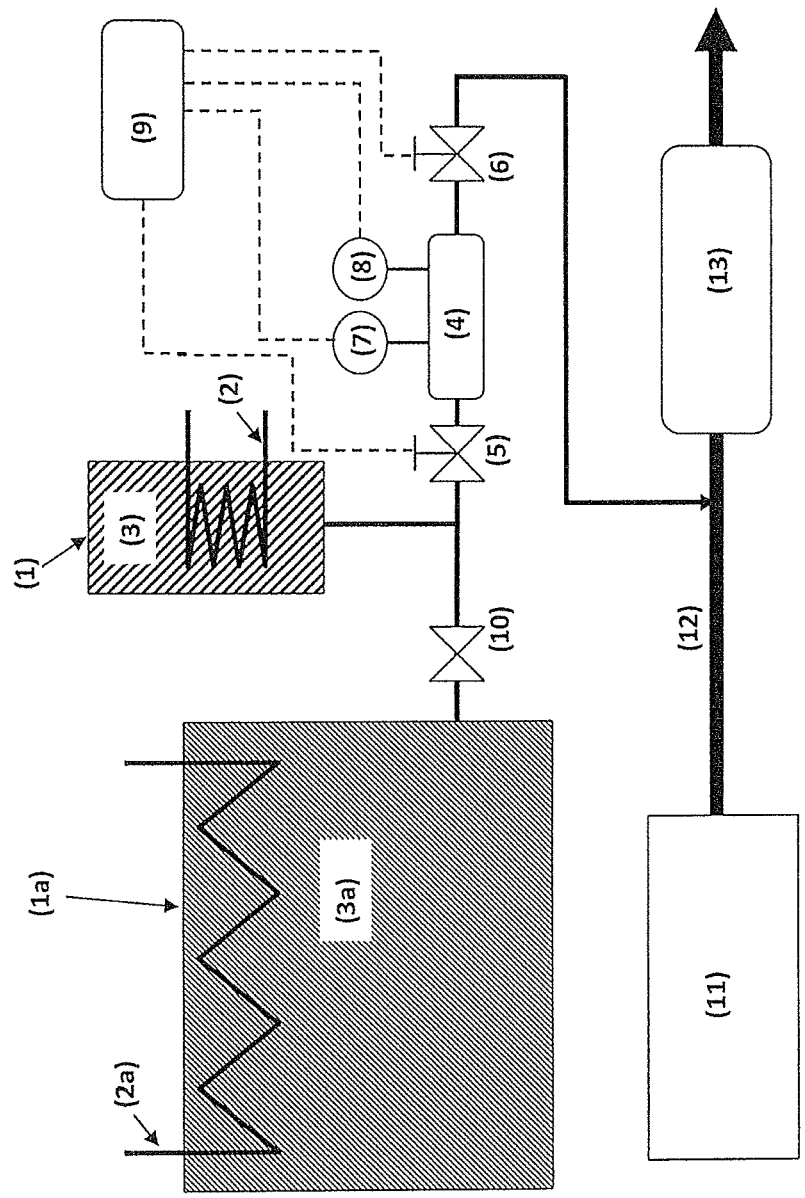
FIG. 3 shows an embodiment of the invention for control of NOx emissions from a combustion engine with a single pressure sensor, based on thermal desorption.

FIG. 3 shows an embodiment according to the invention where the control volume 4 with supply 5 and dosing valves 6, and sensors for pressure 7 and temperature 8 is a part of a larger system comprising at least two storage units (1 or 1a) with storage material (3 or 3a), heaters (2 or 2a), a valve 10 (active or passive check valve) preventing backflow of ammonia from the small unit 1 to the (one or more) larger unit 1a, an engine 11 with exhaust 12 and an SCR catalyst 13 for reducing NOx using the ammonia desorbed and dosed from the solid (3 or 3a). A controller 9 ensures that heating of the storage units gives the desired operating pressure range, reads the value of the relevant sensors and the control of the supply 5 and dosing valve 6 to dose according the control volume method of the invention.

Figure 4:
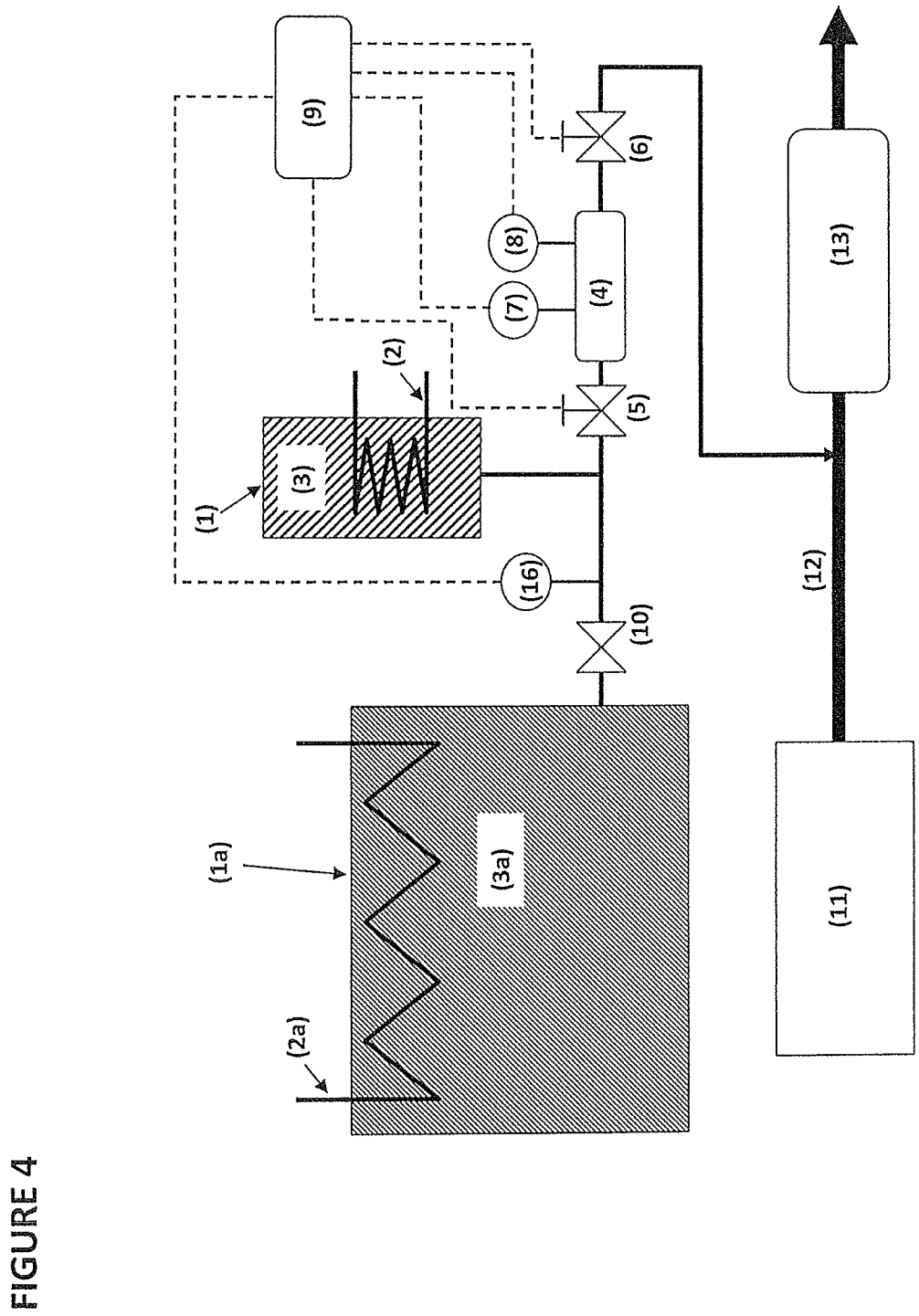
FIG. 4 shows another embodiment similar to FIG. 3, but with an additional single pressure sensor.

FIG. 4 shows a similar embodiment but with an additional pressure sensor 16 to make an independent measurement of the supply pressure from the one or more storage units (1 or 1a).

Figure 5:
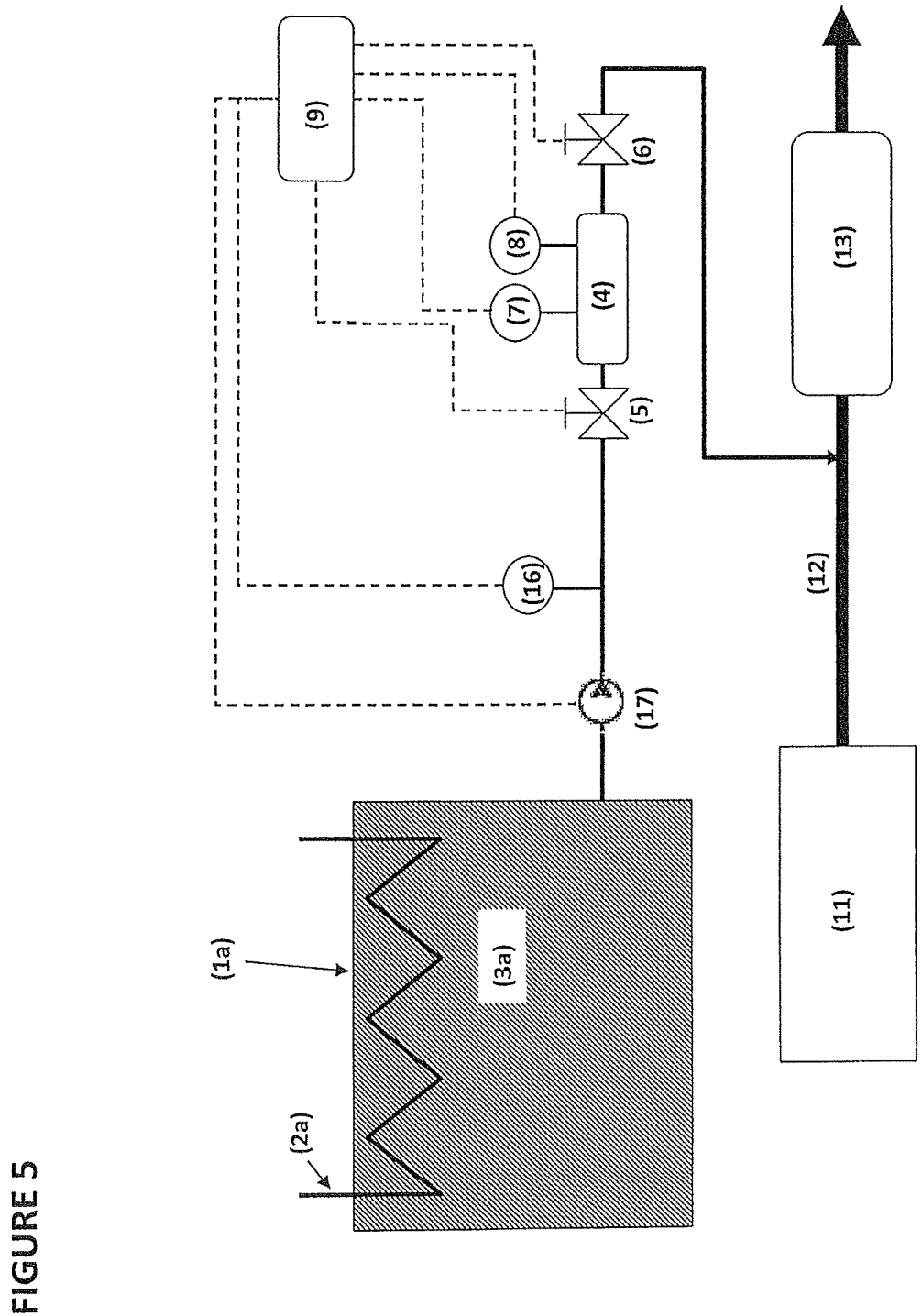
FIG. 5 illustrates embodiments similar to FIGS. 3 and 4, wherein the desorption is facilitated by a vacuum pump, with an only optional heating in the storage volume.

FIG. 5 shows another embodiment where desorption of ammonia is facilitated by a vacuum pump 17 rather than solely by heating. Nevertheless, a heater 2a can be provided in addition to the vacuum pump 17 to support desorption by the vacuum pump 17, if needed. The vacuum pump is on/off-controlled by the controller 9 which ensures that the pumping activity provides the desired operating pressure range. FIG. 5 shows an example with only one storage device 1a, but the vacuum pump can also be used in embodiments with a plurality of storage devices, as e.g. shown in FIGS. 3 and 4. In the example of FIG. 5 an embodiment is shown with an additional pressure sensor 16 to make an independent measurement of the supply pressure from the storage units 1a, as in FIG. 4. In other vacuum-pump embodiments there is only a single pressure sensor, that is to say the control volume's pressure sensor 7, as in FIG. 3, and the supply pressure is measured by the control volume's pressure sensor 7 during filling events when the supply valve 5 is open and the dosing valve 6 is closed.

Figure 6:
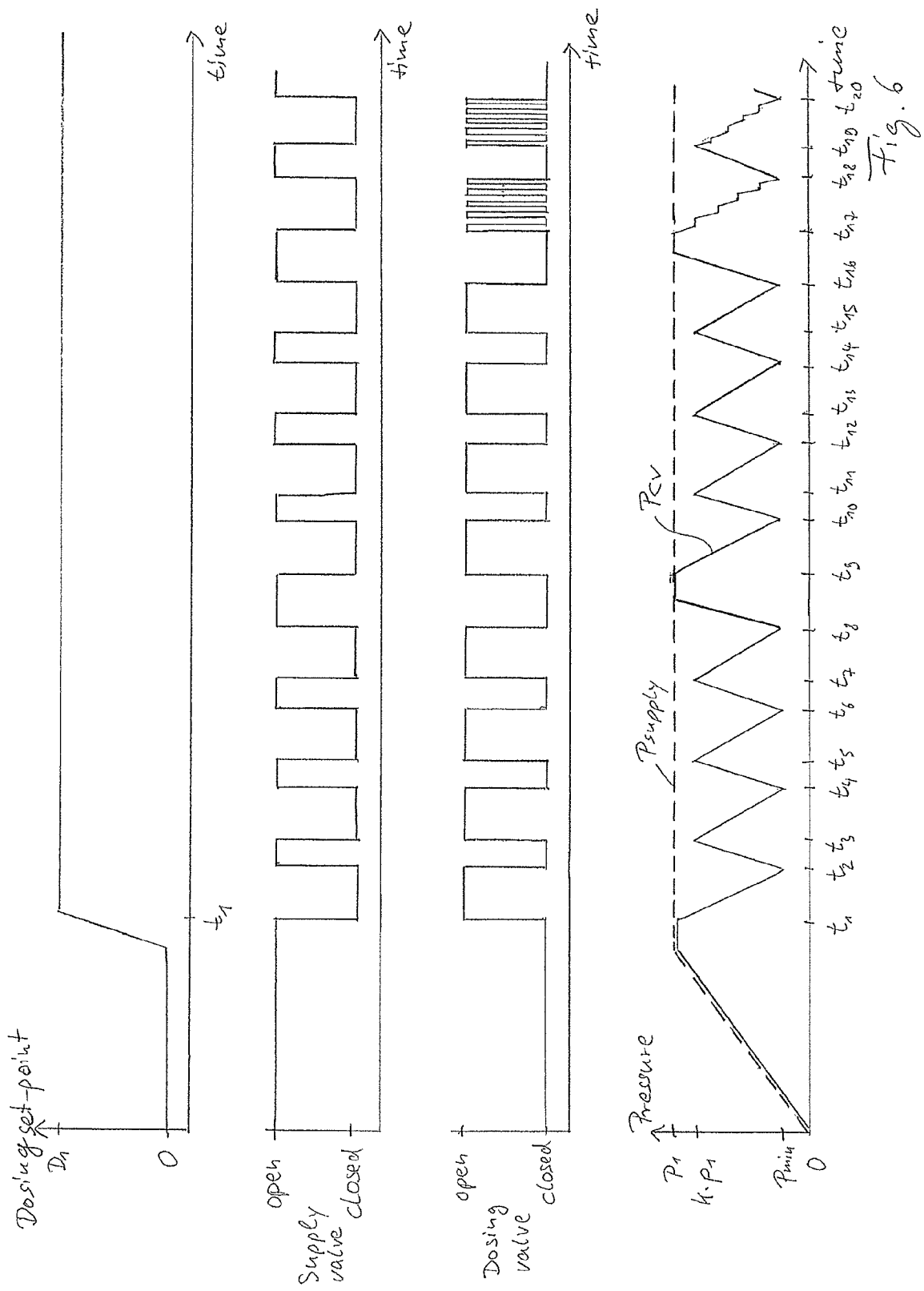
FIG. 6 illustrates by means of timing diagrams valve positions and supply-pressure measurement in certain embodiments with a single pressure sensor.

In FIG. 6 schematic timing diagrams of the dosing set-point, the on/off-state of the supply valve 5, the on/off-state of the dosing valve 6, the supply pressure $P_{Supply}$ and the control-volume pressure $P_{CV}$ (which corresponds to the pressure measured by the single pressure sensor 7) for certain embodiments are shown.

The dosing set-point, in this example, is assumed to be initially zero and then, at time $t_1$, raised to a certain value, called $D_1$.

The supply valve 5 and the dosing valve 6 are closed and opened in a complementary manner; i.e. the supply valve is open when the dosing valve is closed, and vice versa. The valves 5, 6, are repeatedly opened and closed, wherein the opening time intervals of the dosing valve are generally longer than those of the supply valve because for example, the supply valve's orifice is bigger than the dosing valves orifice, or due to rapid on-off pulsing of the dosing valve with a duty factor smaller than one. In the example shown, there are short (ordinary) filling events between $t_2$ and $t_3$, $t_4$ and $t_5$, $t_6$ and $t_7$, $t_{10}$ and $t_{11}$, $t_{12}$ and $t_{13}$, $t_{14}$ and $t_{15}$, $t_{18}$ and $t_{19}$, and extended filling events between $t_8$ and $t_9$, $t_{16}$ and $t_{17}$ (in the example shown every fourth filling event is extended). The dosing intervals (dosing periods), however, are shown to be nearly equal. At the initial stage, when the dosing set-point is zero, the supply valve 5 is permanently open while the dosing valve 6 is closed.

The supply pressure $P_{Supply}$ is shown to rise at the zero set-point stage (e.g. due to a heating-up delay after start-up), and then to be constant at $P_1$ (for simplicity only; as shown in FIG. 2 it may actually fluctuate). The pressure $P_{CV}$ in the control volume—which is also the pressure "seen" by the single pressure sensor 7—equals the supply pressure $P_{Supply}$ during the zero set-point stage where the supply valve 5 is permanently open, and also reaches the supply pressure $P_{Supply}$ during the extended filling events. However, during the short filling events $P_{CV}$ does not reach $P_{supply}$ completely, but only reaches a reduced pressure $k \cdot P_1$, where k may be a constant smaller one, e.g. in the range between 0.5 and 0.99. The dosing periods from $t_1$ to $t_{17}$ illustrate embodiments with continuous dosing, while the dosing periods from $t_{17}$ to $t_{20}$ illustrate discontinuous dosing (short pulsing). The duty cycle shown, as an example, in the discontinuous-dosing periods of FIG. is about 50%. Since the overall dosing rate is similar to the continuous dosing periods illustrated in FIG. 6 it can be assumed that the cross section of the dosing-valve opening is is greater by a factor of approximately two in the discontinuous-dosing example than that of the continuous-dosing example.

Thus, FIG. 6 illustrates several aspects:
(i) In embodiments without extended filling events and relatively short filling time the control-volume pressure $P_{CV}$ does not reach $P_{Supply}$ completely. Nevertheless, $P_{Supply}$ can be approximately determined by the measurement of $P_{CV}$ by the single pressure sensor during the short filling events, by dividing the measured $P_{CV}$ by k, provided that k is approximately known in advance (for example, k can be experimentally determined once as a function of the filling time and the measured $P_{CV}$). In such embodiments the extended filling events shown in FIG. 6 can be omitted.
(ii) Embodiments with extended filling are directly illustrated by FIG. 6. In such embodiments, $P_{Supply}$ can be directly measured by the measurement of $P_{CV}$ by the single pressure sensor during the extended filling events. The k-factor correction described at (i) is not necessary and can be omitted, as the k-factor equals one (or is very close to one), due to the extended filling time.
(iii) FIG. 6 also illustrates embodiments in which the supply valve is permanently open when the dosing set-point is zero. During the set-point-zero stage $P_{Supply}$ can be directly measured by the measurement of $P_{CV}$ by the single pressure sensor, without any correction. This set-point-zero functionality can be combined with single-sensor pressure measurement during filling event with or without extended filling events.
(iv) Discontinuous dosing (illustrated between $t_{17}$ and $t_{18}$, as well as $t_{19}$ and $t_{20}$) involves rapidly repeated opening and closing the dosing valve 6; the flow is controlled by changing the open/close-duty factor of the dosing valve 6. The discontinuous-dosing functionality can be used with or without any other of the functions (i) to (iii) of FIG. 6.

Figure 7:
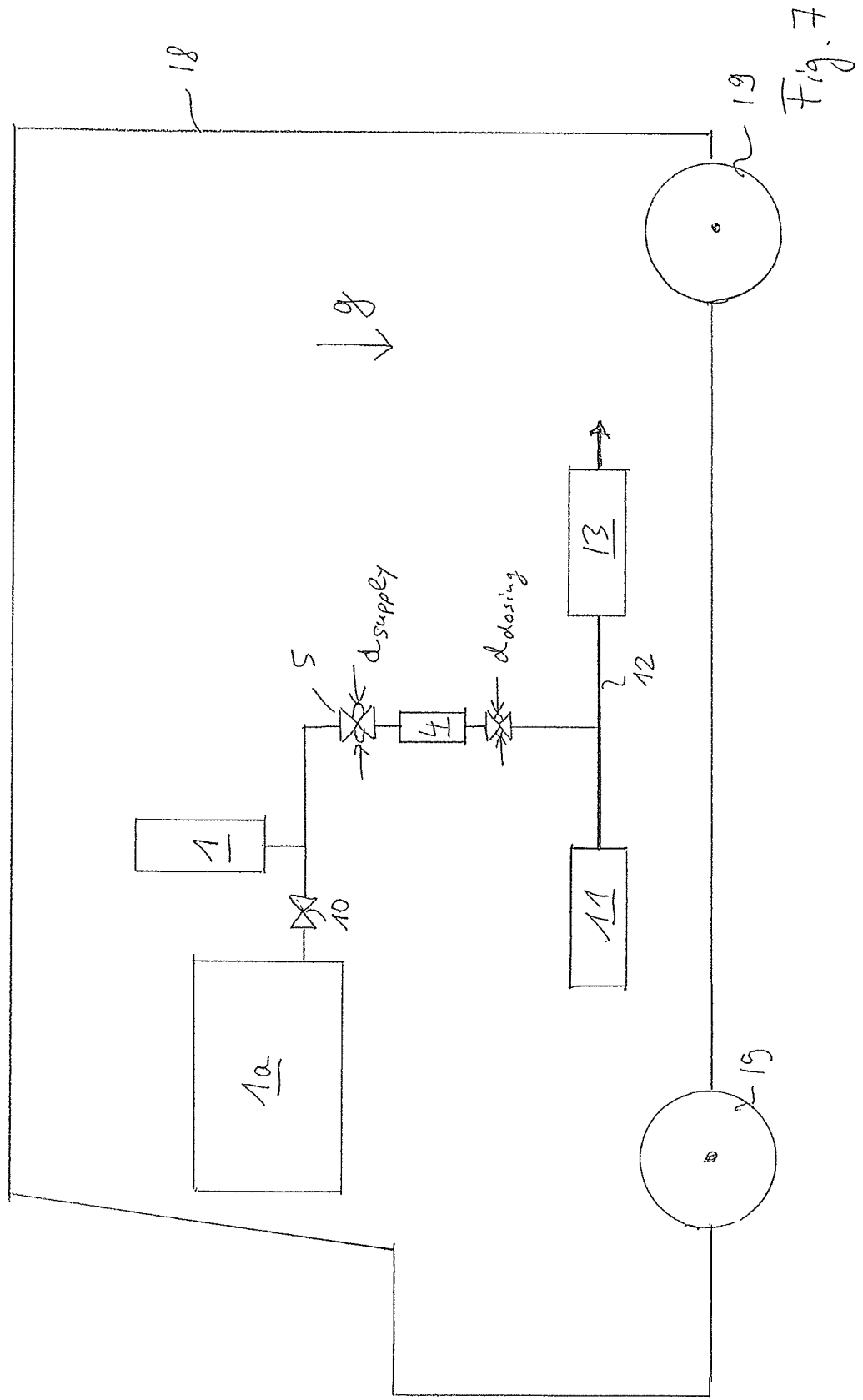
FIG. 7 schematically illustrates an embodiment of a dosing device (device for controlled flow of a gas to a process) which a vertically mounted control chamber.

In FIG. 7 the control chamber 4 is mounted vertically (this also represents embodiments in which it is mounted inclined, at an angle less than 90° relative to the vertical direction. The supply 5 valve is arranged above the control chamber 4, and the dosing valve 6 is arranged below the control chamber's lowest point. Terms like "vertical", "below" above refer to the nominal operating position. For example, in a car (18 in FIG. 7) the normal operating position is when the car 18 rests on its wheels 19 on a horizontal surface. The vertical direction is illustrated by arrow g in FIG. 7.). This arrangement prevents build-up of condensate or impurities inside the control volume 4.

What is also illustrated in FIG. 7 is that the opening of the orifice of the supply valve 5, here denoted by $d_{supply}$, is larger than that of the dosing valve 6, here denoted by $d_{dosing}$.

The two aspects illustrated in FIG. 7—vertical or inclined arrangement of the control chamber 4, and larger supply-valve opening—can be provided individually or in combination.

FIGS. 8a and b illustrates two different embodiments of feed-back control of dosing to reduce or eliminate deviations or the actually dosed amount from the target dose, implemented in the controller 9. As the feed-back functionalities described in connection with FIGS. 8a and 8b can not only be applied at the level of dosing periods but, in some embodiments, also at the level of the short dosing events, the term "cycle" is used below.

"Cycle" mainly stands for "dosing period", but may also stand for "dosing event", in some embodiments. In both figures the middle line illustrates the target dose per cycle (which is assumed to be constant in the time interval shown), the actually dosed amount in each cycle (shown by solid lines) and the accumulated dosing error, which are the dosing errors, summed over all cycles (shown by hashed lines). The "dosing error" in a cycle is considered to be the difference of the actually dosed amount and the target dose for that cycle). For both embodiments the illustration starts with a certain amount of excess dosing (i.e. a positive dosing error) in the first cycle.

According to the first embodiment (FIG. 8a) the excess, or positive dosing error, is counter acted by reducing the dose. For example, according to a common integrating controller (I controller) the rate by which the actual dose approaches the target dose is proportional to the inverted error signal, as it is suggested by the solid line in FIG. 8a. Finally, the error signal is completely removed. That is to say, when a dosing error happens the feed-back control action ensures that the amount actually dosed per cycle is taken back to the target dose per cycle. As long as the error persists the accumulated error increases. Once the error is completely removed, the increase of the accumulated error is stopped; and the dosing error accumulated so far persists without further change (until the next error happens to occur).

However, the second embodiment (FIG. 8b) even compensates the accumulated dosing error. To this end, the dosing error per cycle is not simply brought to zero, as in the embodiment of FIG. 8a, but is rather caused to overshoot the target dose towards the region of the reversed sign of the error (in FIG. 8b: towards "deficit"). The controller accumulates the error for all cycles and adjusts the operation with reversed-sign error such that it compensates all the initial error and thus brings the accumulated dosing error to zero. This accumulation process may be relatively fast, e.g. compared with the typical time constant of NOx reduction by SCR in vehicles or trucks. Although the first embodiment provides a good solution to control NOx reduction, the second embodiment can even further reduce the rate of escaping NOx e.g. under changing operating conditions.

In a preferred embodiment of the invention, the storage material (3, 3a) is a metal ammine complex—in particular $Sr(NH_3)_8Cl_2$, $Ca(NH_3)_8Cl_2$, $Mn(NH_3)_6Cl_2$, $Mg(NH_3)_6Cl_2$ or mixtures thereof. Other materials such as zeolites or active carbon can be applied.

The invention—implemented as a method or device—is particularly advantageous for solid ammonia storage system used for reduction of NOx by SCR in vehicles or trucks (or similar applications requiring ammonia storage) powered by combustion engine where the storage system—apart from the dosing hardware—has one or more of the following features:

- a smaller storage unit (as example—but not limited to—50 ml to 3 liter in size containing 25 g to 1.5 kg $NH_3$ stored), heated by electricity or other means. Other capacities are possible.
- one or more larger solid storage units with means for heating (as example—but not limited to—500 ml to 20 liters containing 400 g to 20 kg $NH_3$) capable of storing enough ammonia for a desired vehicle service operating interval (e.g. 25000 km).
- a controller with models or algorithms according to the invention which allows for the estimation of the flow and for controlling the heating of the storage units.

If the filling level of the smaller unit is known before dosing, the control of the dosing according to the present invention can be used to calculate the real-time saturation degree of the smaller storage unit and thereby using that as a parameter to decide when to heat a larger unit for transferring ammonia from a larger unit to the smaller unit.

The invention claimed is:

1. A method for controlled dosing of ammonia to an ammonia consuming process, wherein the ammonia consuming process is performed by an SCR catalyst for NOx reduction from exhaust coming from an internal combustion engine, said method being carried out by using an apparatus comprising:
   - a control volume with a known volume;
   - a supply valve that controls the fluid communication between a source of the gas and the control volume;
   - a dosing valve that controls the fluid communication between the control volume and a process whereto the gas is being dosed;
   - a pressure sensor and a temperature sensor that measure pressure and temperature of the gas in the control volume;
   - wherein the supply pressure of the ammonia is a fluctuating supply pressure generated by desorption of ammonia from a solid storage material in a storage unit, and wherein the method comprises:
   - introducing ammonia into the control volume and thereby raising the control-volume pressure by opening the supply valve with the dosing valve closed;
   - dosing of ammonia through the dosing valve while the supply valve is closed; recording the decrease in control-volume pressure;
   - recording the decrease in control-volume pressure;
   - calculating the amount of dosed ammonia based on the known volume of the control volume and at least one of the change in control-volume pressure and control-volume temperature in the period where the supply valve is closed;
   - comparing the amount of dosed ammonia with a target or set-point to adjust or regulate the subsequent dosing period or dosing event.

2. The method according to claim 1 where the supply pressure of the ammonia is generated by thermal desorption from the solid storage material in a storage unit equipped with a heater to control the operating range of the supply pressure, or where the supply pressure of the ammonia to the supply valve is generated by a vacuum pump connected to a solid storage material that releases ammonia by desorption because of reduced gas phase pressure in the storage unit created by the pump vacuum.

3. The method of claim 1 where the supply pressure of the at least one storage unit and the pressure in the control volume are measured alternatively with one single pressure sensor, that is the pressure sensor of the control volume, wherein the supply pressure of the at least one storage unit is determined by the pressure sensor during periods where the dosing valve is closed and the supply valve is open, while the pressure in the control volume is determined by the pressure sensor during periods where the supply valve is closed and the dosing valve is open or closed.

4. The method of claim 3 wherein the supply pressure of the at least one storage unit is not determined at each filling incident in all dosing events, but only at a subsample of the filling events, wherein the opening time of the supply valve in filling incidents in which the supply pressure of the at least one storage unit is determined is extended so that it is longer than the average opening time of the supply valve in filling incidents in which the supply pressure is not determined.

5. The method of claim 4 wherein the extended opening time is long enough to ensure that the pressure sensor's signal is within 50%, of the actual supply pressure from the storage unit.

6. The method of claim 1 wherein, when the dosing set-point is zero, the dosing valve is closed and the supply valve is open, and the supply pressure of the at least one storage unit is then permanently measured by the pressure sensor of the control volume.

7. The method of claim 3 wherein the measurement of the supply pressure of the at least one storage unit determined by the single pressure sensor is an input to the control of a heater or the vacuum pump to release ammonia.

8. The method of claim 1 wherein, in response to a deviation between the dosing target, or set-point, the amount of dosed ammonia is regulated so that the accumulated dosed amount corresponds to the accumulated target amount.

9. The method of claim 1 wherein a plurality of dosing events are performed during a dosing period between subsequent control-volume refills.

10. The method of claim 9 wherein a determination of the amount of ammonia dosed during a dosing period comprising a plurality of dosing events is performed based on measurements of the control-volume pressure at the beginning and at the end of the dosing period.

11. A controller for a vehicle that uses a solid ammonia storage material for the purpose of removing NOx by selective catalytic reduction, said controller being programmed to carry out a method comprising:
    introducing ammonia into a control volume and thereby raising a control-volume pressure by opening a supply valve with a dosing valve closed;
    dosing of ammonia through the dosing valve while the supply valve is closed;
    recording a decrease in control-volume pressure;
    calculating an amount of dosed ammonia based on a known volume of the control volume and at least one of a change in control-volume pressure and control-volume temperature in the period where the supply valve is closed;
    comparing the amount of dosed ammonia with a target or set-point to adjust or regulate the subsequent dosing period or dosing event.

12. A device for controlled flow of ammonia to an ammonia consuming process performed by an SCR catalyst for NOx reduction from exhaust coming from an internal combustion engine, said device comprising:
    one or more storage units containing solid storage material capable of reversible absorption, or adsorption, and desorption of ammonia, said unit being equipped with heating to release ammonia by desorption, or being connected to a vacuum pump that releases ammonia by desorption because of reduced gas phase pressure;
    a control volume with a pressure sensor and temperature sensor to determine pressure and temperature of the ammonia in the control volume;
    a valve on each side of the control volume, that is a supply valve and a dosing valve, for controlling the flow of the ammonia into the control volume from the one or more storage units when the dosing valve is closed while the supply valve is open and to dose the ammonia through the dosing valve when the supply valve is closed;
    a controller that is programmed to control the heating or the vacuum pump of the one or more storage units (1;1a) to obtain a supply pressure within a desired interval between am minimum supply pressure and a maximum supply pressure, upstream of the control volume and furthermore to carry out a dosing method comprising:
    introducing ammonia into the control volume and thereby raising the control-volume pressure by opening the supply valve with the dosing valve closed;
    dosing of ammonia through the dosing valve while the supply valve is closed;
    recording the decrease in control-volume pressure;
    calculating the amount of dosed ammonia based on the known volume of the control volume and at least one of the change in control-volume pressure and control-volume temperature in the period where the supply valve is closed;
    comparing the amount of dosed ammonia with a target or set-point to adjust or regulate the subsequent dosing period or dosing event.

13. The device according to claim 12 with heating, further comprising an additional storage unit and an additional storage-unit valve, either an active or a passive check valve, which prevents the gas from the heated storage unit to be absorbed in the additional storage unit when the additional storage unit is either not heated, or has a lower pressure than the heated storage unit.

14. The device according to claim 12 where the pressure sensor of the control volume is the only pressure sensor of the device for controlled flow of ammonia to the ammonia consuming process and has a double function to alternatively measure the supply pressure of the at least one storage unit and the pressure in the control volume, depending on the open or closed state of the supply valve and the dosing valve.

15. The device according to claim 12 where the control volume is placed in an upright or inclined orientation in which the outlet from the dosing valve is positioned lower than, or equal in height with, the lowest point of the control volume and is positioned lower than the supply valve.

16. The device according to claim 12 where the supply and dosing valves have orifices, and the orifice of the supply valve is larger than that of the dosing valve.

17. The device according to claim 12 where the supply and dosing valves are designed to be forced open at a relief pressure to provide a pressure relief function.

* * * * *